US012534192B2

(12) United States Patent
Persteins et al.

(10) Patent No.: US 12,534,192 B2
(45) Date of Patent: Jan. 27, 2026

(54) BODY WITH ROTATING OBJECT MOVING THROUGH FLUID

(71) Applicants: Alexander Persteins, Weston, FL (US); Nicolas Rizq, Weston, FL (US)

(72) Inventors: Alexander Persteins, Weston, FL (US); Nicolas Rizq, Weston, FL (US)

( * ) Notice: Subject to any disclaimer, the term of this patent is extended or adjusted under 35 U.S.C. 154(b) by 102 days.

(21) Appl. No.: 18/348,100

(22) Filed: Jul. 6, 2023

(65) Prior Publication Data
US 2024/0010328 A1    Jan. 11, 2024

Related U.S. Application Data (60) Provisional application No. 63/358,708, filed on Jul. 6, 2022.

(51) Int. Cl.
*B64C 23/08* (2006.01)
(52) U.S. Cl.
CPC .................................. *B64C 23/08* (2013.01)
(58) Field of Classification Search
CPC ....................................................... B64C 23/08
See application file for complete search history.

(56) References Cited

U.S. PATENT DOCUMENTS

| | | | | |
|---|---|---|---|---|
| 1,613,834 A * | 1/1927 | Jordanoff | ................ | B64C 23/08 244/10 |
| 1,714,609 A * | 5/1929 | Massey | ................... | B64C 23/08 244/206 |
| 1,850,925 A * | 3/1932 | Evans | ..................... | B64C 23/08 244/10 |
| 1,875,276 A * | 8/1932 | Steigert | ................... | B64C 23/08 244/10 |
| 1,927,537 A * | 9/1933 | Zaparka | ................. | B64C 23/08 244/10 |
| 2,039,676 A * | 5/1936 | Zaparka | ................. | B64C 23/08 244/21 |
| 2,339,575 A * | 1/1944 | Lee | ......................... | F01P 7/023 415/905 |
| 2,985,406 A * | 5/1961 | Bump | .................... | B64C 23/08 244/10 |
| 3,065,928 A * | 11/1962 | Dornier | ................... | B64C 23/08 244/12.1 |
| 3,092,354 A * | 6/1963 | Alvarez-Calderon | ..................... | B64C 23/08 244/206 |
| 3,162,402 A * | 12/1964 | Alvarez-Calderon | ..................... | B64C 23/08 244/206 |
| 3,630,470 A * | 12/1971 | Elliott | .................... | B64C 29/00 244/23 C |
| 4,630,997 A * | 12/1986 | Cousteau | ............... | B64C 21/06 416/4 |

(Continued)

*Primary Examiner* — William L Gmoser
(74) *Attorney, Agent, or Firm* — Thomas E. Lees, LLC (57) ABSTRACT

A system takes advantage of the Magnus effect to increase the efficiency of a moving structure by increasing the forces generated by a fluid moving relative to the structure, e.g., to improve lift, drag, etc. The system includes a structure having a first side and a second side opposite the first side. An object coupled to the structure, e.g., a cylinder, is exposed to a fluid such as air. The object is journaled for rotation relative to the structure so as to disrupt the fluid around the object. A drive source causes the object to rotate relative to the structure so as to cause a select one of an upward lift, or a downward drag.

17 Claims, 7 Drawing Sheets

(56) References Cited

U.S. PATENT DOCUMENTS

| | | | | |
|---|---|---|---|---|
| 5,180,119 | A * | 1/1993 | Picard | B64C 23/08 244/206 |
| 5,875,627 | A * | 3/1999 | Jeswine | B64C 23/08 60/221 |
| 6,231,004 | B1 * | 5/2001 | Peebles | B64C 23/08 244/9 |
| 7,641,144 | B2 * | 1/2010 | Kummer | B64C 23/02 244/12.5 |
| 9,409,643 | B2 * | 8/2016 | Mores | B64C 27/06 |
| 2010/0281874 | A1 * | 11/2010 | Rice | B64C 15/02 60/770 |
| 2017/0058826 | A1 * | 3/2017 | Rice | F02K 1/008 |
| 2022/0009618 | A1 * | 1/2022 | Fine | B64C 3/28 |
| 2024/0166340 | A1 * | 5/2024 | Viyurkov | B64U 10/10 |

* cited by examiner

BODY WITH ROTATING OBJECT MOVING THROUGH FLUID

CROSS REFERENCE TO RELATED APPLICATIONS

This application claims the benefit of U.S. Provisional Patent Application Ser. No. 63/358,708, filed Jul. 6, 2022, entitled "BODY WITH ROTATING OBJECT MOVING THROUGH FLUID", the disclosure of which is hereby incorporated by reference in its entirety.

BACKGROUND

Various aspects of the present disclosure relate generally to a body that includes a rotating object, and more particularly, to a body having a rotating object that moves through a fluid. By way of example, the body can comprise a vehicle (e.g., an airfoil, aircraft, a ground vehicle, a watercraft vehicle, or other mobile vehicle) having a rotating object that takes advantage of the Magnus effect.

The Magnus effect describes a phenomenon associated with a spinning object moving through a fluid, such as air. The rotation of the object causes a difference in the pressure of the fluid on opposite sides of the spinning object. As such, the travel path of the object deflects from what the travel path would otherwise be were the object not spinning.

BRIEF SUMMARY

According to aspects of the present disclosure, systems and methods take advantage of the Magnus effect to increase efficiency by increasing the forces generated by a moving fluid such as lift, downward force, etc.

According to further aspects herein, a system includes a structure having a first side and a second side opposite the first side. An object, e.g., a cylinder, is coupled to the structure, and is exposed to a fluid such as air. The object is journaled for rotation relative to the structure so as to disrupt the fluid around the object. A drive source causes the object to rotate relative to the structure so as to cause a select one of a directional force such as upward lift or downward draft, e.g., against the structure. In some embodiments, the object does not extend beyond the first side of the structure, and does not extend beyond the second side of the structure. In other embodiments, the object may optionally extend from at least one surface of the structure. Also, embodiments are disclosed herein that include the object oriented in different positions relative to the structure, examples of which are set out more fully herein.

According to yet further aspects of the present disclosure, a method comprises providing a structure having a first side and a second side opposite the first side. The method also comprises coupling an object to the structure so as to be exposed to a fluid. Here, the object is journaled for rotation relative to the structure so as to disrupt the fluid around the object. The method further comprises controlling a drive source that causes the object to rotate relative to the structure so as to produce a directional force causing a select one of an upward lift, or a downward drag against the structure.

DETAILED DESCRIPTION

In a conventional aircraft such as an airplane, successful takeoff into the air depends upon "lift". Lift occurs because of an aerodynamic force. More particularly, lift is the component of an aerodynamic force that is perpendicular to the relative freestream velocity of air surrounding a wing of the airplane. Correspondingly, "drag" is the component of the aerodynamic force that is parallel to the relative freestream velocity.

Lift is created by a combination of airplane speed and airplane wing shape. The shape of an airplane wing forces air to travel a longer distance over the top of the wing than the air traveling underneath the wing. Essentially, the air above the wing travels a greater distance than the air passing underneath the wing, in the same amount of time. Because of this effect, the air above the wing has a corresponding velocity greater than the velocity of the air below the wing, causing a pressure difference in the air. This pressure difference is characterized by a relatively higher pressure below the wing compared to the air above the wing. For a given wing configuration, this pressure difference increases as a function of speed of the aircraft. When the aircraft reaches a certain speed, the pressure difference is sufficient to overcome the weight of the aircraft, and the aircraft begins to lift off the ground.

An "airfoil" is the cross-sectional shape of an object, such as a wing of an aircraft. Typically, in aircraft design, the airfoil is designed to be able to generate more lift than drag. This can be accomplished for the example case of an aircraft designed for subsonic speeds, by having a rounded leading edge and a sharp trailing edge.

Conventional aircraft wings rely upon flaps to change shape. Adjustment of the flap is used to increase or decrease the camber of the aircraft wing, thus increasing lift (e.g., during takeoff) or to increase drag (e.g., in preparation of landing). Thus, the performance of the airfoil is largely dictated by the shape and size of the airfoil.

However, according to aspects herein, an airfoil design is augmented with a rotating object, which utilizes the Magnus effect to alter the performance of the airfoil, in some cases, without changing the physical external configuration of the airfoil. In an example embodiment, an airfoil configuration combines an airfoil with a Magnus cylinder to increase lift and therefore efficiency during flight.

In other embodiments, the system can be a structure having an object attached thereto, which takes advantage of the Magnus effect to affect forces acting on the object, and hence, the structure, further examples of which are set out in greater detail herein.

Figure 1:
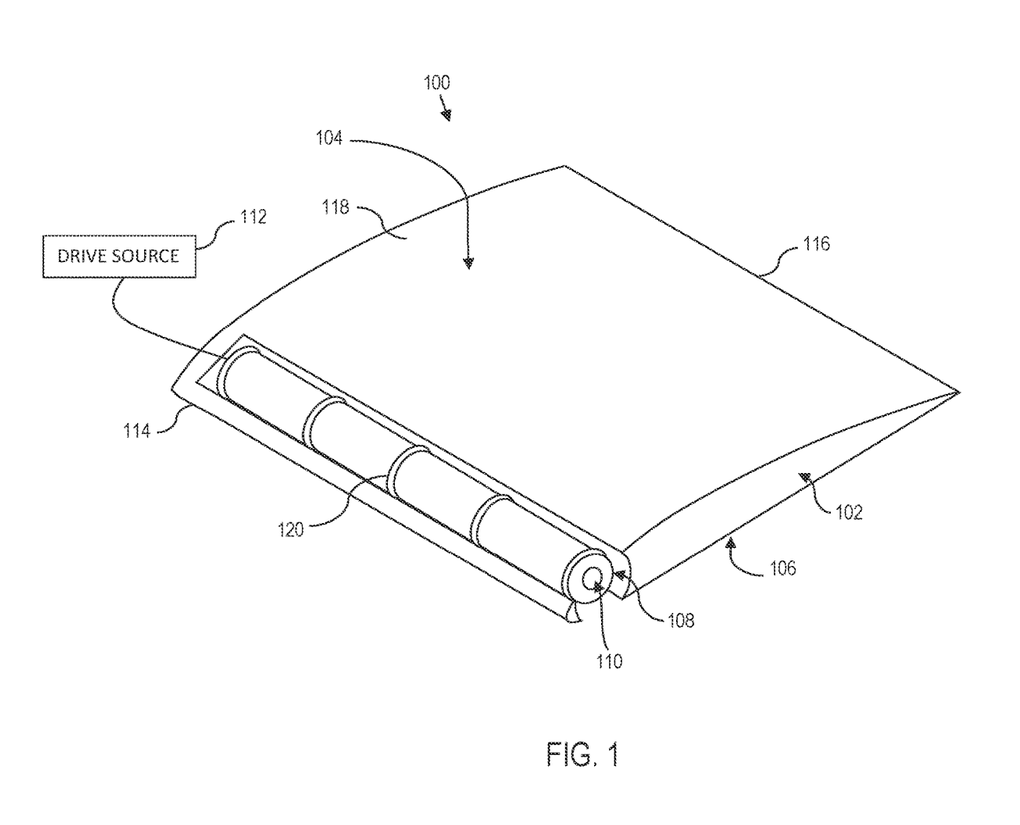
FIG. 1 is a partial cutout and schematic view of a system having a rotating object according to aspects of the present disclosure herein, in an example form of an aircraft wing.

Referring to FIG. 1, a system 100 is illustrated, which takes advantage of the Magnus effect. As will be described in greater detail herein, the system 100 increases the forces generated by a moving fluid such as lift, downward force, etc. The system 100 includes in general, a body illustrated as a structure 102, which may be exposed to a fluid, such as air. In the illustrated example, the structure 102 is an aircraft wing, which is shown as a partial cutout/schematic view for clarity of discussion herein. In practical applications, the system 100 can be implemented in any vehicle that can benefit from lift, drag, downforce, etc. This may comprise an ariel vehicle, such as an aircraft, drone, or other flying object. This could also include a ground vehicle such as a car, mobile robot or other mobile device. In the case of a ground vehicle, the Magnus effect may be used to pull the vehicle towards the ground, e.g., for increased traction, stability, etc.

Yet further, the system 100 can include a non-vehicle structure, e.g., a wind turbine, stationary spinning propellor, etc.

The system 100 can also be implemented in watercraft. In this regard, in practical applications, the specific configuration of the structure 100 will vary to match the application.

Regardless of application/vehicle, the structure 102 will have a first side 104 (e.g., a top surface of the aircraft wing as illustrated) and a second side 106 opposite the first side 104 (e.g., a bottom surface of the aircraft wing as illustrated). As illustrated for sake of clarity of discussion, the first side 104 and the second side 106 need not be parallel and can be oriented in any manner.

An object 108 is coupled to the structure 102 so as to be exposed to a fluid, such as air. The object 108 is journaled for rotation relative to the structure 102, e.g., via a suitable shaft 110, so as to disrupt the fluid around the structure 102 and/or object 108.

Notably, in some embodiments, the object 108 is coupled to the structure 102 so as to extend flush to at least one of the first side 104 of the structure 102 and the second side 106 of the structure 102.

As another example, in some embodiments, the object 108 is coupled to the structure 102 so as to extend beyond at least one of the first side 104 of the structure 102 and the second side 106 of the structure 102.

In yet further configurations, the object 108 does not extend beyond the first side 104 of the structure 102. Moreover, in some embodiments, the object 108 does not extend beyond the second side 106 of the structure 102. In yet further embodiments, the object 108 does not extend beyond either the first side 104 or the second side 106.

In yet further embodiments, the object is coupled to the structure so as to not extend beyond any external side of the structure (e.g., the object 108 may be contained entirely within the structure 102).

As noted more fully herein, in some embodiments, the object 108 need not extend beyond an external surface of the structure 102. For instance, an airfoil may include an object 108 such as a cylinder that does not extend beyond an exterior surface of the airfoil (e.g., the object can be contained within the structure 102, the object 108 can be oriented so as to align flush with one or more surfaces of the structure 102, etc.). In other embodiments, one or more features of the object 108 may extend (at least) partially beyond an exterior of the structure 102.

A drive source 112 is coupled to the object 108. The drive source 112 causes the object 108 to rotate relative to the structure 102. In an example embodiment, the drive source 112 causes the object 108 to rotate relative to the structure 102 so as to produce a directional force, e.g., causing a select one of an upward lift, or a downward drag against the structure 102.

In an example embodiment, the drive source 112 is user controllable to cause lift. In another example embodiment, the drive source 112 is user controllable to cause drag. As still another embodiment, the drive source is user controllable to cause lift, or drag, depending upon a user selection. According to yet additional embodiments, the drive source 112 is user controllable to cause lift, or drag, depending upon system requirements at that instant, wherein a control system utilizes lift measuring mechanisms with feedback to allow system stabilization according to adaptive input/output control algorithms.

In practical applications, the drive source 112 controls the object 108 to rotate so as to cause a directional force, e.g., an upward lift or a downward drag (which can include downforce). In some embodiments, the drive source 112 is user controllable or automatically controllable according to an algorithm to selectively cause lift or drag, depending upon the user selection.

In another example embodiment, the drive source 112 is automated and adjusts depending on system requirements at that instant. Such a control system may utilize lift measuring mechanisms with feedback to allow the system stabilization according to adaptive input/output control algorithms.

In practical applications, the system 100 can include bearings, lubricating systems, brackets, securements, and other features that position, secure, and facilitate rotation of the object 108.

In the illustrated example, the structure 102 comprises a wing of an aircraft. The wing has a rounded leading edge 114 and a trailing edge 116 that is sharper than the leading edge. The object 108 is between the leading edge 114 and the trailing edge 116. However, this is by example only, and not by way of limitation.

Moreover, in some embodiments, the object 108 comprises a cylinder. The cylinder can be controlled by the drive source 112 to rotate in a single direction, e.g., in a select one of clockwise or counterclockwise. In some embodiments, the drive source 112 can reverse directions such that the cylinder can rotate clockwise or counterclockwise, e.g., based upon a user selection, based upon automated control, etc.

In an example embodiment, the object 108 comprises a cylinder. Additionally, the system 100 further comprises at least one additional cylinder 108. Here, each additional cylinder 108 is coupled to the structure 102 and is journaled for rotation relative to the structure 102 so as to disrupt the fluid around the structure 102.

In some embodiments, the object 108 can be implemented by multiple cylinders. In an example embodiment, the cylinders are aligned axially. In some embodiments, the cylinders are controlled to operate similarly. In another example embodiment, each cylinder can be independently controlled. In this regard, the drive source 112 may include multiple control connections, each independently controllable to control a corresponding cylinder.

As noted more fully herein, in some embodiments, the cylinder (or other rotating object) can be completely contained within the structure 102. For instance, in some embodiments, the cylinder does not extend above the first surface 104 of the structure 102, and does not extend below the second surface 106 of the structure 102. In this regard, the cylinder 108 may be exposed to the fluid around the object 102, e.g., via an opening in the structure 102. As another example, the cylinder can be contained within the structure 102, e.g., not directly exposed to the fluid surrounding the structure 102 such that the fluid acted on by the cylinder is different form the fluid surrounding the structure 102. In other embodiments, the cylinder 108 extends above the first surface 104 of the structure 102, and also extends below the second surface 106 of the structure 102, as illustrated. In this configuration, the fluid around the object 108 is common with the fluid around the structure 102. In yet alternative embodiments, the cylinder extends above the first surface 104 of the structure 102, but does not extend below the second surface 106 of the structure 102. In yet alternative embodiments, the cylinder does not extend above the first surface 104 of the structure 102, but does extend below the second surface 106 of the structure 102. Still further, the cylinder can extend flush with one or more surfaces of the structure 102.

In the example of FIG. 1, the object 108, e.g., rotating cylinder, is positioned toward, but spaced behind, the leading edge 114 of the structure 102. In an alternative embodiment, the object 108, e.g., a cylinder, is positioned toward, but spaced in front of, the trailing edge 116 of the structure 102. In still further embodiments, the object 108, e.g., cylinder, is positioned within a mid-section 118 of the structure 102.

In some embodiments, the cylinder runs parallel to a leading edge of the structure 102. In other embodiments, the cylinder does not need to run parallel to a leading edge. In some embodiments, the cylinder may not run parallel to any other edge of the corresponding structure 102. For instance, there may be benefits to angling the cylinder relative to the structure 102.

In some embodiments, the structure includes one instance of the object 108. In other embodiments, multiple objects are provided, which can each be positioned based upon the intended functionality of the object 108.

In some practical applications, the amount (if any) that the object 108 extends from the first surface 104 and/or the second surface 106 can depend upon the application. However, generally, the extension of the rotating object beyond the first surface 104 and second surface 106 speeds up the air going over the top of the wing and slows down the air on the bottom of the wing. This creates a corresponding decrease in pressure on top and an increase in pressure under the wing.

To maintain the structural integrity of the complete wing, the airfoil segments containing the Magnus object(s) (e.g., cylinder(s)) is supported by the wing structure itself. The rotating elements themselves may not form a straight line on the wing. The exact pattern of the Magnus cylinders may vary depending upon the intended application.

Moreover, the object, e.g., cylinder, can have one or more features 120, such as ridges, ribs, fins, vanes, dimples, or other characteristics that contribute to the Magnus effect.

As will be described more fully herein, in some embodiments, the object 108 comprises a cylinder and the structure 102 comprises an airfoil. In some instances, the cylinder is a split cylinder. In some instances, the cylinder size is even to edges of the airfoil. In yet further instances, the cylinder size is smaller than edges of the airfoil.

As will also be described more fully herein, in some embodiments, the object 108 comprises a cylinder that is perpendicular to a front of the structure, or a cylinder that is at an angle that is not parallel and not perpendicular to the front of the structure.

Figure 2:
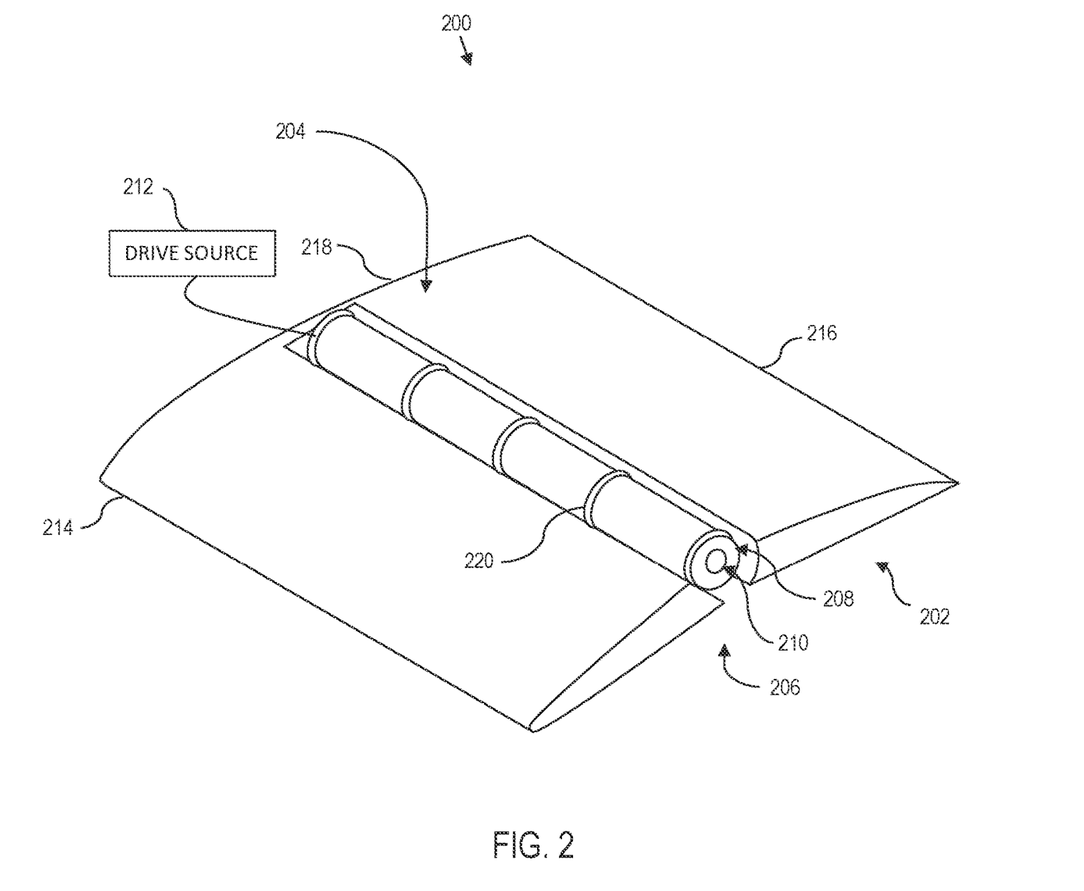
FIG. 2 is a partial cutout and schematic view of a system according to aspects of the present disclosure herein, in an example form of an aircraft wing, showing an alternative position of a rotating object.

Referring to FIG. 2, another example, configuration is illustrated. In this regard, like structure is illustrated with like reference numerals 100 higher than the counterpart in FIG. 1. In this regard, all of the discussion of FIG. 1 is incorporated by reference to the corresponding features of FIG. 2 in any combination.

As noted more fully herein, a system 200 is illustrated, which takes advantage of the Magnus effect. As will be described in greater detail herein, the system 200 increases the forces generated by a moving fluid such as lift, downward force, etc. The system 200 includes in general, a body illustrated as a structure 202, which may be exposed to a fluid, such as air. In the illustrated example, the structure 202 is an aircraft wing, which is shown as a partial cutout/schematic view for clarity of discussion herein. In practical applications, the system 200 can be implemented in any vehicle, examples of which are described with reference to FIG. 1.

Regardless of application/vehicle, the structure 202 will have a first side 204 and a second side 206 opposite the first side 104. As illustrated for sake of clarity of discussion, the first side 204 and the second side 206 need not be parallel and can be oriented in any manner.

An object 208 is coupled to the structure 202 so as to be exposed to a fluid, such as air. The object 208 is journaled for rotation relative to the structure 202, e.g., via a suitable shaft 210, so as to disrupt the fluid around the structure 202 and/or object 208. Example configurations for the object 208 are analogous to those described with reference to the object 108, FIG. 1.

A drive source 212 is coupled to the object 208. The drive source 212 causes the object 208 to rotate relative to the structure 202. In an example embodiment, the drive source 212 causes the object 208 to rotate relative to the structure 202 so as to produce a directional force, e.g., causing a select one of an upward lift, or a downward drag against the structure 202. Example configurations for the drive source 212 are analogous to those described with reference to the drive source 112, FIG. 1.

In the illustrated example, the structure 202 comprises a wing of an aircraft. The wing has a rounded leading edge 214 and a trailing edge 216 that is sharper than the leading edge. The object 208 is between the leading edge 214 and the trailing edge 216. However, this is by example only, and not by way of limitation. Example configurations for the drive positioning of the object 208 relative to the leading edge 214 and the trailing edge 216 are analogous to those described with reference FIG. 1.

FIG. 2 differs from FIG. 1 in that the rotating object 208 is positioned in the mid-section 218 in FIG. 2.

Moreover, the object 208, e.g., cylinder, can have one or more features 220, such as ridges, ribs, fins, vanes, dimples, or other characteristics that contribute to the Magnus effect, examples of which are analogous to those described with reference to FIG. 1.

Referring to the FIGURES generally, regardless of configuration, multiple cylinders can be added to the system 100, 200. That is, there is no requirement that the system is constrained to one on each airfoil. Moreover, cylinders can be placed anywhere on or within the airfoil. Moreover, the embodiments herein are not limited to an airfoil. For instance, the system 100, 200 herein can be used on aircraft (to increase lift), on ground vehicles (to increase downforce), and in other applications.

Regardless, the Magnus-airfoil hybrid described herein enhances a base, conventional airfoil to increase the force production on anything that utilizes an airfoil. For airplanes, the system 100, 200 can be operated to increase lift and therefore efficiency, which decreases the carbon footprint of the aircraft, and has the potential to shorten runways. The only currently known solutions for this are addressed through different wing shapes and the mitigation of drag vortexes coming off wingtips. However, the illustrated wing introduces a new mechanism that utilizes a spinning element that can be used for any object that needs an upward or downward force, including but not limited to, airplanes, helicopters, race cars, wind turbines, etc.

Moreover, in some embodiments, the drive source 112, 212, e.g., one or more motor, can control the object to affect when the object rotates, which direction the object rotates, the speed of rotation, which can be dynamic, combinations thereof, etc. Thus, applications are wide and varied. Anytime an airfoil is used to generate force, the system herein will improve its performance. When activated, the object spins creating the Magnus effect on the airfoil that adds to the force already produced by the airfoil such as lift or downforce.

This can result in aircraft that are upwards of 50 percent more efficient. In this regard, such efficiencies are also introduced in structures 102 that are not airfoils, e.g., on-the-ground vehicles, water craft, stationary devices such as turbines, etc. Moreover, in some embodiments, the drive source 112, 212 can be user controlled, thus enabling when the Magnus effect is utilized. Still further, where the drive source 112, 212 is variable (e.g., a variable speed motor), a user or automated system can control the amount of contribution of the object to increase lift (or drag).

Figure 3A:
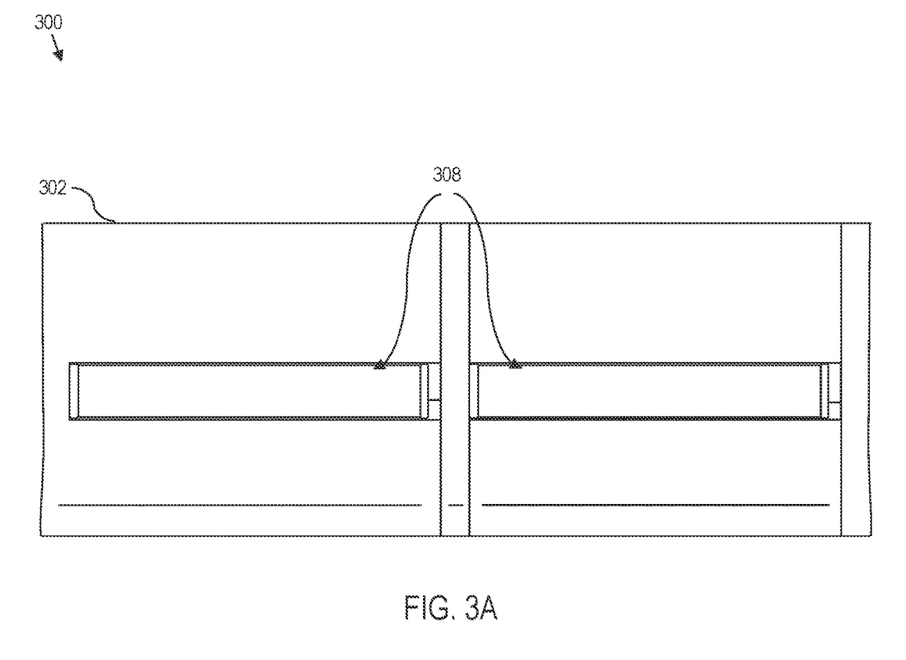
FIG. 3A is a schematic top view of an example split cylinder airfoil.
Figure 3B:
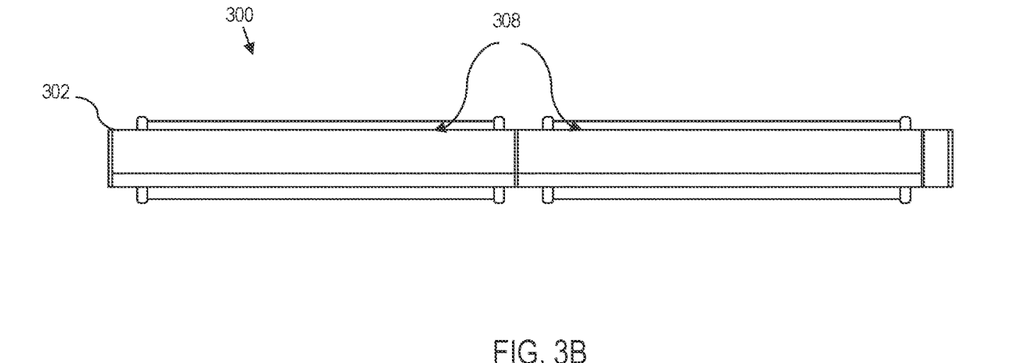
FIG. 3B is a schematic side view of the airfoil of FIG. 3A.

Referring generally to FIG. 3A and FIG. 3B, FIG. 3A is a schematic top view of an example split cylinder airfoil system 300, and FIG. 3B is a schematic side view of the airfoil system 300 of FIG. 3A. In this regard, like structure is illustrated with like reference numerals 200 higher than the counterpart in FIG. 1, and 100 higher than the counterpart in FIG. 2. In this regard, all of the discussion with regard to the preceding FIGURES can be incorporated by reference to the corresponding features in any combination. In the illustrated configuration, the structure 302 contains a split object 308, e.g., a split cylinder comprising two cylinders as shown, although any number of cylinders may be incorporated. As illustrated, the split cylinders run generally parallel to and spaced from the leading edge of the structure solely for sake of illustration.

Figure 4A:
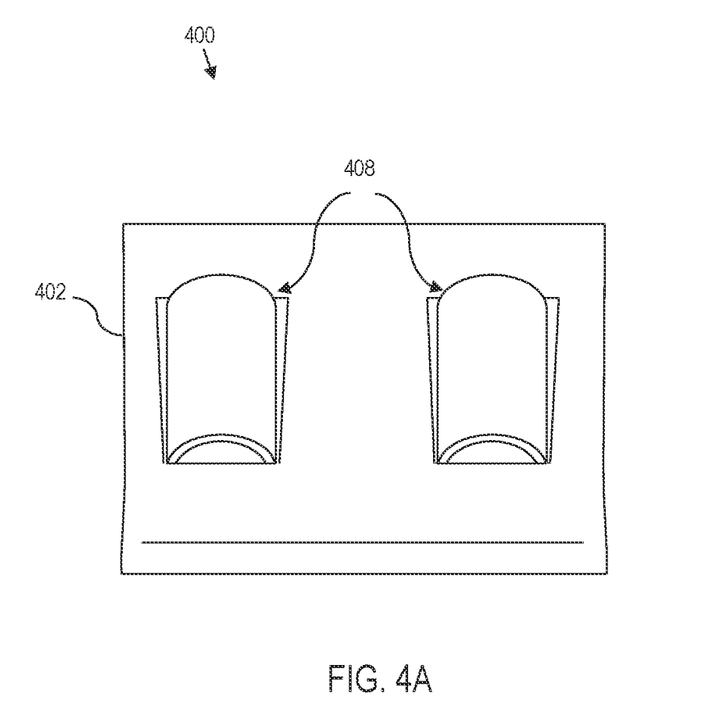
FIG. 4A is a schematic top view of an example airfoil having one or more cylinders perpendicular to the front of the airfoil.
Figure 4B:
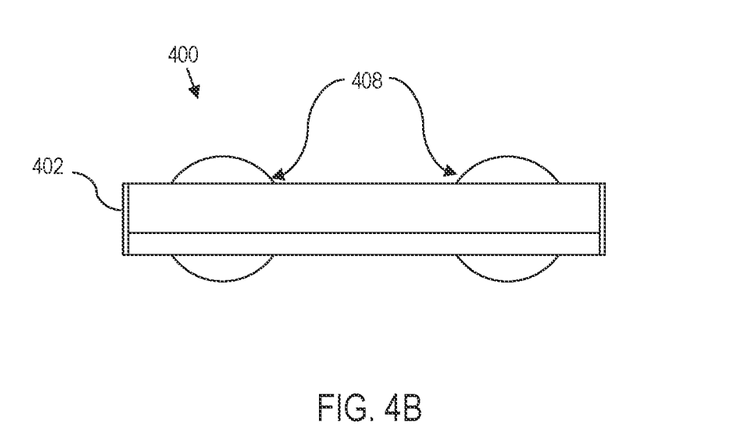
FIG. 4B is a schematic side view of the airfoil of FIG. 4A.

Referring generally to FIG. 4A and FIG. 4B, FIG. 4A is a schematic top view of an example airfoil system 400 is illustrated as having one or more cylinders perpendicular to the front of the airfoil. FIG. 4B is a schematic side view of the airfoil system 400 of FIG. 4A. In this regard, like structure is illustrated with like reference numerals 300 higher than the counterpart in FIG. 1, 200 higher than the counterpart in FIG. 2, and 100 higher than the counterpart in FIG. 3A and FIG. 3B. In this regard, all of the discussion with regard to the preceding FIGURES can be incorporated by reference to the corresponding features in any combination. In the illustrated configuration, the structure 402 contains one or more object(s) 408, e.g., two cylinders as shown, although any number of cylinders may be incorporated. Moreover, the illustrated cylinders are perpendicular to the front of the structure 402 (e.g., leading edge of an airfoil).

Figure 5A:
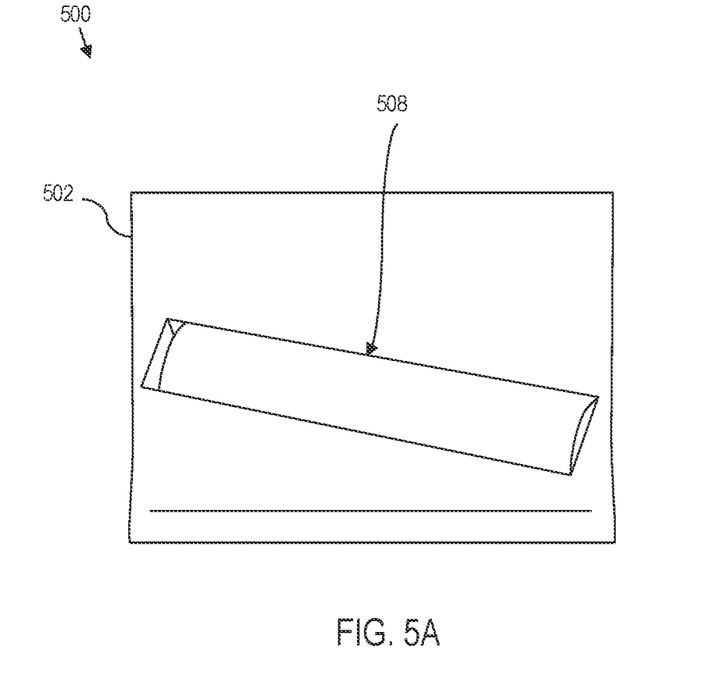
FIG. 5A is a schematic top view of an example airfoil having one or more cylinders at a non-perpendicular angle to the front of the airfoil.
Figure 5B:
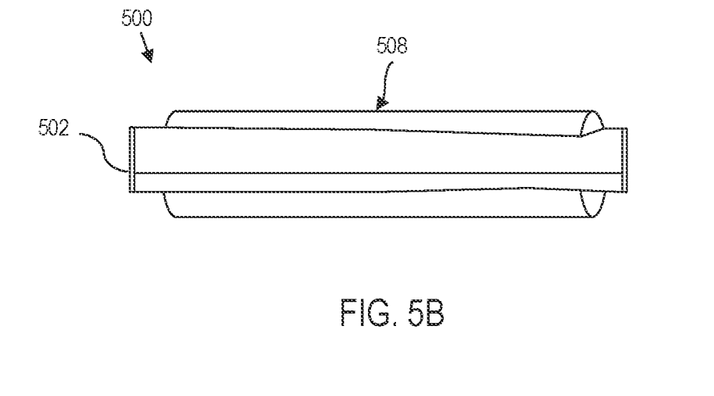
FIG. 5B is a schematic side view of the airfoil of FIG. 5A.

Referring generally to FIG. 5A and FIG. 5B, FIG. 5A is a schematic top view of an example airfoil system 500 having one or more cylinders at a non-perpendicular angle to the front of the airfoil. FIG. 5B is a schematic side view of the airfoil system 500 of FIG. 5A. In this regard, like structure is illustrated with like reference numerals 400 higher than the counterpart in FIG. 1, 300 higher than the counterpart in FIG. 2, 200 higher than the counterpart in FIG. 3A and FIG. 3B, and 100 higher than the counterpart in FIG. 4A and FIG. 4B. In this regard, all of the discussion with regard to the preceding FIGURES can be incorporated by reference to the corresponding features in any combination.

In the illustrated configuration, the structure 502 contains one or more object(s) 508, e.g., one cylinder as shown, although any number of cylinders may be incorporated. Moreover, the illustrated cylinder is at an angle. In the illustrated configuration, the cylinder is at an angle that is not parallel and not perpendicular to the leading edge of the structure 502.

Figure 6A:
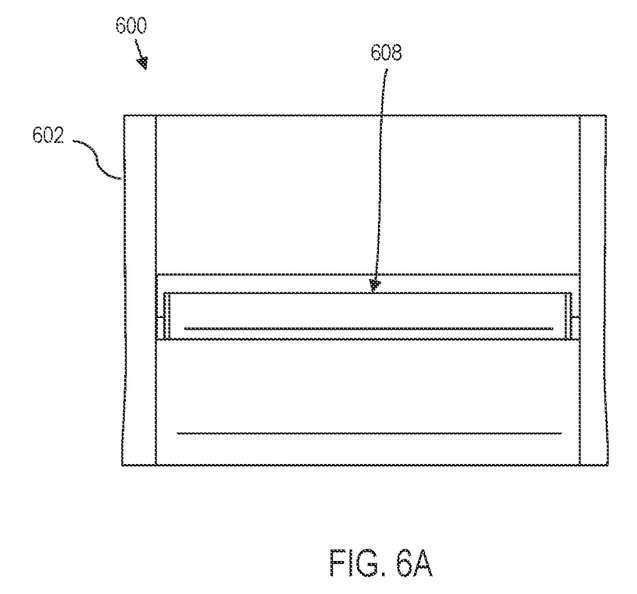
FIG. 6A is a schematic top view of an example airfoil having one or more cylinders where the cylinder size is generally even to the edges of the airfoil.
Figure 6B:
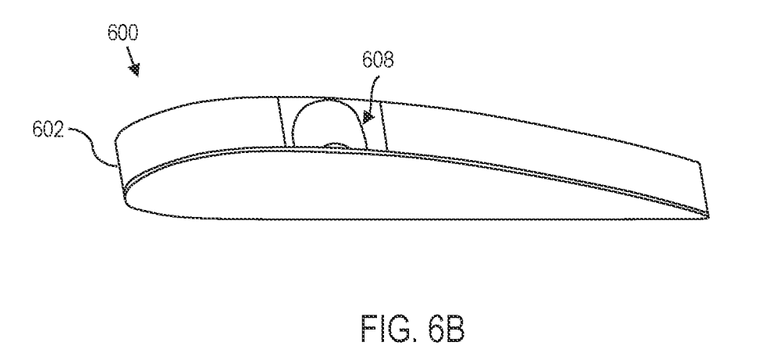
FIG. 6B is a schematic side view of the airfoil of FIG. 6A.

Referring generally to FIG. 6A and FIG. 6B, FIG. 6A is a schematic top view of an example airfoil system 600 having one or more cylinders where the cylinder size is generally even to the edges of the airfoil. FIG. 6B is a schematic side view of the airfoil system 600 of FIG. 6A. In this regard, like structure is illustrated with like reference numerals 500 higher than the counterpart in FIG. 1, 400 higher than the counterpart in FIG. 2, 300 higher than the counterpart in FIG. 3A and FIG. 3B, 200 higher than the counterpart in FIG. 4A and FIG. 4B, and 100 higher than the counterpart in FIG. 5A and FIG. 5B. In this regard, all of the discussion with regard to the preceding FIGURES can be incorporated by reference to the corresponding features in any combination.

In the illustrated configuration, the structure 602 contains one or more object(s) 608, e.g., one cylinder as shown, although any number of cylinders may be incorporated. Moreover, the illustrated cylinder is configured such that the cylinder size is even to at least one edge of the structure 602.

Figure 7A:
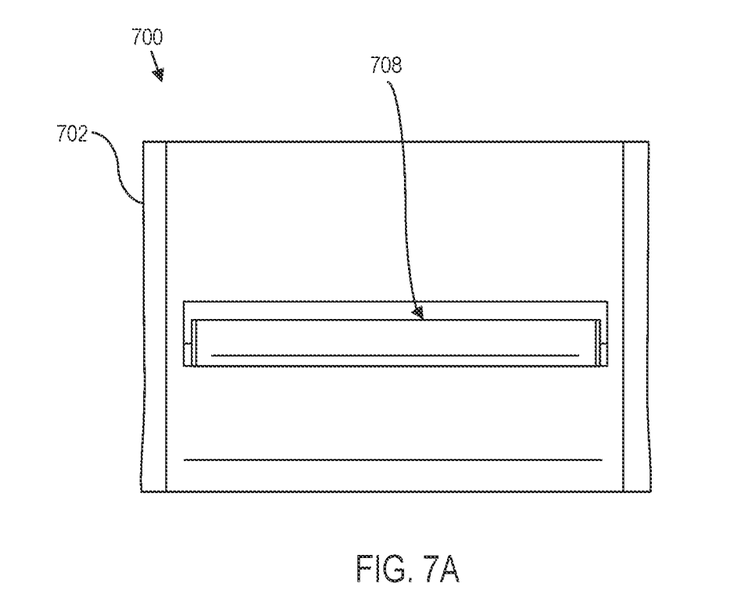
FIG. 7A is a schematic top view of an example airfoil having one or more cylinders where the cylinder size is generally smaller than the edges of the airfoil.
Figure 7B:
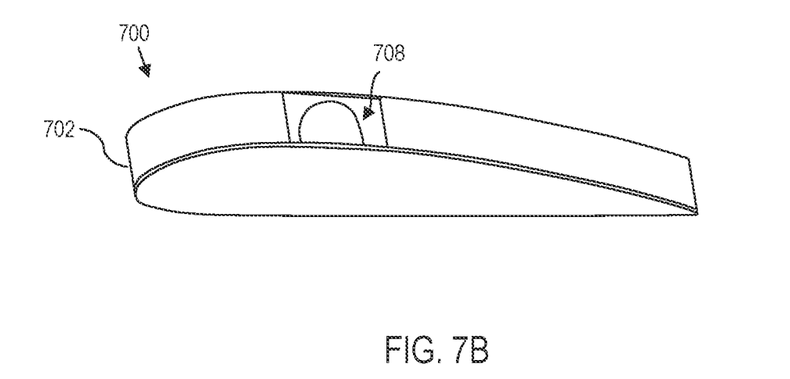
FIG. 7B is a schematic side view of the airfoil of FIG. 7A.

Referring generally to FIG. 7A and FIG. 7B, FIG. 7A is a schematic top view of an example airfoil system 700 having one or more cylinders where the cylinder size is generally smaller than the edges of the airfoil. FIG. 7B is a schematic side view of the airfoil system 700 of FIG. 7A. In this regard, like structure is illustrated with like reference numerals 600 higher than the counterpart in FIG. 1, 500 higher than the counterpart in FIG. 2, 400 higher than the counterpart in FIG. 3A and FIG. 3B, 300 higher than the counterpart in FIG. 4A and FIG. 4B, 200 higher than the counterpart in FIG. 5A and FIG. 5B, and 100 higher than the counterpart in FIG. 6A and FIG. 6B. In this regard, all of the discussion with regard to the preceding FIGURES can be incorporated by reference to the corresponding features in any combination.

In the illustrated configuration, the structure 702 contains one or more object(s) 708, e.g., one cylinder as shown, although any number of cylinders may be incorporated. Moreover, the illustrated cylinder is configured such that the cylinder size is smaller than the edges of the structure 702.

In some embodiments, any combination of features, configurations, orientations, sizes, etc., can be combined in any order, e.g., depending upon the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure. Aspects of the disclosure were chosen and described in order to best explain the principles herein, and the practical application, and to enable others of ordinary skill in the art to understand the invention for various embodiments with various modifications as are suited to the particular use contemplated.

What is claimed is:

1. A system comprising:
   a structure having a first side and a second side opposite the first side;
   an object coupled to the structure, the object further exposed to a fluid, wherein the object is journaled for rotation relative to the structure so as to disrupt the fluid around the object, wherein the object comprises a cylinder;
   an additional cylinder coupled to the structure and journaled for rotation relative to the structure so as to disrupt the fluid around the structure; and
   a drive source that causes the object and the additional cylinder to rotate relative to the structure so as to produce a directional force causing a select one of an upward lift, or a downward drag against the structure, wherein the drive source is user controllable to cause lift or drag, depending upon system requirements at that instant, and a control system utilizes lift measuring mechanisms with feedback to allow the system stabilization according to adaptive input/output control algorithms such that the object and the additional cylinder are controlled independently of each other.

2. The system according to claim 1, wherein:
   the object is coupled to the structure so as to not extend beyond any external side of the structure.

3. The system according to claim 1, wherein:
   the object is coupled to the structure so as to extend flush to at least one of the first side of the structure and the second side of the structure.

4. The system according to claim 1, wherein:
   the object is coupled to the structure so as to extend beyond at least one of the first side of the structure and the second side of the structure.

5. The system according to claim 1, wherein the structure comprises a wing of an aircraft, the wing having a rounded leading edge, a trailing edge that is sharper than the leading edge, and the object between the leading edge and the trailing edge.

6. The system according to claim 5, wherein: the cylinder is controlled by the drive source to rotate a select one of clockwise or counterclockwise.

7. The system according to claim 1, wherein the cylinder includes at least one of a rib, a fin, a ridge, a vane, or a dimple around a circumference thereof.

8. The system according to claim 1, wherein the object is positioned toward, but spaced behind, a leading edge of the structure.

9. The system according to claim 1, wherein the object is positioned within a mid-section of the structure.

10. The system according to claim 1, wherein the object is positioned toward, but spaced in front of, a trailing edge of the structure.

11. The system according to claim 1, wherein the cylinder comprises a split cylinder and the structure comprises an airfoil.

12. The system according to claim 1, wherein the cylinder is perpendicular to a front of the structure.

13. The system according to claim 1, wherein the cylinder is at an angle that is not parallel and not perpendicular to the front of the structure.

14. The system according to claim 1, wherein the structure comprises an airfoil, wherein the cylinder size is even to edges of the airfoil.

15. The system according to claim 1, wherein the structure comprises an airfoil, wherein the cylinder size is smaller than edges of the airfoil.

16. A system comprising:
    a structure having a first side and a second side opposite the first side;
    a cylinder coupled to the structure, the cylinder further exposed to a fluid, wherein the cylinder is journaled for rotation relative to the structure so as to disrupt the fluid around the cylinder; and
    an additional cylinder coupled to the structure and journaled for rotation relative to the structure so as to disrupt the fluid around the structure;
    a drive source that causes the cylinder and the additional cylinder to rotate relative to the structure so as to produce a directional force causing a select one of an upward lift, or a downward drag against the structure, wherein the drive source is user controllable to cause lift or drag, depending upon system requirements at that instant, and a control system utilizes lift measuring mechanisms with feedback to allow the system stabilization according to adaptive input/output control algorithms such that the object and the additional cylinder are controlled independently of each other;
    wherein:
    the cylinder includes at least one of a rib, a fin, a ridge, a vane, or a dimple;
    the cylinder is positioned spaced behind a leading edge of the structure; and
    the drive source is user controllable to cause at least one of lift or drag.

17. A method comprising:
    providing a structure having a first side and a second side opposite the first side;
    coupling an object to the structure such that the object is exposed to a fluid, wherein the object is journaled for rotation relative to the structure so as to disrupt the fluid around the object, wherein the object is a cylinder;
    coupling an additional cylinder to the structure such that the additional cylinder is exposed to the fluid, wherein the additional cylinder is journaled for rotation relative to the structure so as to disrupt the fluid around the structure; and
    controlling a drive source that causes the object to rotate relative to the structure so as to produce a directional force causing a select one of an upward lift, or a downward drag against the structure, depending upon system requirements at that instant, and a control system utilizes lift measuring mechanisms with feedback to allow the system stabilization according to adaptive input/output control algorithms such that the object and the additional cylinder are controlled independently of each other.

* * * * *